United States Patent
Perry et al.

(10) Patent No.: US 9,267,437 B2
(45) Date of Patent: Feb. 23, 2016

(54) MICRO GAS TURBINE ENGINE FOR POWERING A GENERATOR

(71) Applicant: Electric Jet, LLC, Blacksburg, VA (US)

(72) Inventors: Matthew V. Perry, Blackburg, VA (US); Jordan T. Farina, Beaverton, OR (US); Stephen D. LePera, Blacksburg, VA (US); Anthony M. Ferrar, Christiansburg, VA (US); Walter F. O'Brien, Blacksburg, VA (US); Samuel Shiver, Blacksburg, VA (US)

(73) Assignee: Electric Jet, LLC, Blacksburg, VA (US)

( * ) Notice: Subject to any disclaimer, the term of this patent is extended or adjusted under 35 U.S.C. 154(b) by 143 days.

(21) Appl. No.: 14/190,897

(22) Filed: Feb. 26, 2014

(65) Prior Publication Data
US 2014/0319843 A1    Oct. 30, 2014

Related U.S. Application Data

(60) Provisional application No. 61/769,501, filed on Feb. 26, 2013.

(51) Int. Cl.
*F01D 15/10*    (2006.01)
*F02C 7/224*    (2006.01)
(Continued)

(52) U.S. Cl.
CPC ............... *F02C 7/224* (2013.01); *F01D 15/10* (2013.01); *F02C 3/00* (2013.01); *F02C 6/00* (2013.01);
(Continued)

(58) Field of Classification Search
CPC .......... F05D 2250/82; F02C 6/00; F02C 3/00; F01D 15/10; F03D 5/02
USPC .............. 290/52; 60/625, 626, 726, 508, 516, 60/772
See application file for complete search history.

(56) References Cited

U.S. PATENT DOCUMENTS 262,422 A    8/1882  Irwin
3,975,900 A   8/1976  Pfefferle
(Continued)

FOREIGN PATENT DOCUMENTS

EP    0863369 A2    9/1998
EP    1107752       6/2001
(Continued)

OTHER PUBLICATIONS

Hamilton, Project Title: Micro Turbine Generator Program (2000).
(Continued)

*Primary Examiner* — Julio Gonzalez Ramirez
(74) *Attorney, Agent, or Firm* — Charles S. Sara, Esq.; DeWitt Ross & Stevens SC

(57) ABSTRACT

A unique, small microturbine engine adapted to integrate with an electrical generator for producing electrical power has been developed. The microturbine includes an ejector cooling scheme, a prevaporizing combustor, and a combustor air bypass. The ejector cooling scheme uses energy in the hot exhaust gas stream of the microturbine to entrain a flow of ambient air that cools the generator. The prevaporizing combustor of the present invention allows liquid fuel to be vaporized in a small amount of air prior to combustion, thereby increasing combustion efficiency and decreasing combustor size requirements. The combustor air bypass allows a fraction of the compressor discharge air to bypass the prevaporizing combustor under certain operating conditions. This permits control of the overall equivalence ratio and the fuel/air mixing process in the combustion zone, improving efficiency and operability.

19 Claims, 8 Drawing Sheets

(51) Int. Cl.

| | |
|---|---|
| *F23R 3/30* | (2006.01) |
| *F23D 11/10* | (2006.01) |
| *F23D 11/44* | (2006.01) |
| *H02K 7/18* | (2006.01) |
| *F02C 3/00* | (2006.01) |
| *F02C 6/00* | (2006.01) |
| *H02K 9/04* | (2006.01) |

(52) U.S. Cl.
CPC ............ *F23D 11/105* (2013.01); *F23D 11/445* (2013.01); *F23D 11/448* (2013.01); *F23R 3/30* (2013.01); *H02K 7/1823* (2013.01); *F05D 2250/82* (2013.01); *F23C 2900/03001* (2013.01); *F23R 2900/03041* (2013.01); *H02K 9/04* (2013.01)

(56) References Cited

U.S. PATENT DOCUMENTS

| | | | |
|---|---|---|---|
| 4,081,957 A | 4/1978 | Cox, Jr. | |
| 4,669,263 A | 6/1987 | Sugiyama | |
| 5,081,832 A | 1/1992 | Mowill | |
| 5,497,615 A | 3/1996 | Noe | |
| 5,680,752 A * | 10/1997 | Skog | 60/772 |
| 5,932,940 A | 8/1999 | Epstein et al. | |
| 6,031,294 A | 2/2000 | Geis et al. | |
| 6,269,626 B1 | 8/2001 | Kim | |
| 6,294,842 B1 | 9/2001 | Skowronski | |
| 6,410,992 B1 | 6/2002 | Wall et al. | |
| 6,455,964 B1 | 9/2002 | Nims | |
| 6,489,692 B1 | 12/2002 | Gilbreth et al. | |
| 6,584,779 B2 * | 7/2003 | Priestley | 60/782 |
| 6,713,892 B2 | 3/2004 | Gilbreth et al. | |
| 6,748,742 B2 | 6/2004 | Rouse et al. | |
| 6,787,933 B2 | 9/2004 | Claude et al. | |
| 6,900,553 B2 | 5/2005 | Gozdawa | |
| 7,096,667 B2 * | 8/2006 | Laster et al. | 60/723 |
| 7,112,036 B2 | 9/2006 | Lubell et al. | |
| 7,124,572 B2 | 10/2006 | Aycock et al. | |
| 7,462,948 B2 | 12/2008 | Toriyama | |
| 7,521,815 B2 | 4/2009 | Lee | |
| 7,574,853 B2 | 8/2009 | Teets et al. | |
| 7,574,867 B2 | 8/2009 | Teets et al. | |
| 7,610,762 B2 | 11/2009 | Ribud et al. | |
| 7,692,326 B2 | 4/2010 | Ono et al. | |
| 8,028,511 B2 * | 10/2011 | Hyakutake et al. | 60/39.12 |
| 8,215,919 B2 | 7/2012 | Jewess | |
| 8,225,615 B2 | 7/2012 | Isomura | |
| 2004/0008010 A1 * | 1/2004 | Ebrahim et al. | 322/44 |
| 2004/0011042 A1 | 1/2004 | Inoue et al. | |
| 2005/0193713 A1 | 9/2005 | Kovasity et al. | |
| 2008/0000238 A1 | 1/2008 | Ribaud et al. | |
| 2008/0016876 A1 | 1/2008 | Colibaba-Evulet et al. | |
| 2009/0051167 A1 * | 2/2009 | Dinu | 290/52 |
| 2010/0175387 A1 * | 7/2010 | Foust et al. | 60/782 |
| 2011/0250057 A1 | 10/2011 | Laurello | |
| 2012/0280517 A1 * | 11/2012 | Hair et al. | 290/1 R |
| 2014/0090387 A1 * | 4/2014 | John et al. | 60/772 |

FOREIGN PATENT DOCUMENTS

| | | |
|---|---|---|
| EP | 1381143 A1 | 1/2004 |
| GB | 1355320 A | 6/1974 |
| WO | WO 2012/039611 A1 | 3/2012 |

OTHER PUBLICATIONS

Lefebvre, Air-Assist Atomizers, Atomization and Sprays, Mar. 30, 1989, pp. 136-139, Hemisphere Publishing Corporation.

Peirs, et al., Development of an axial microturbine for a portable gas turbine generator (2003) J. Micromech. Microeng. 13 S190-S195.

* cited by examiner

MICRO GAS TURBINE ENGINE FOR POWERING A GENERATOR

CROSS-REFERENCE TO RELATED APPLICATION

The application claims priority to U.S. Provisional Application entitled "MICRO GAS TURBINE ENGINE FOR POWERING A GENERATOR," Ser. No. 61/769,501, filed Feb. 26, 2013, which is incorporated herein by reference in its entirety.

FIELD OF THE INVENTION

The present invention is directed to a small microturbine engine adapted to integrate with an electrical generator in such a way as to make a highly efficient, compact system.

BACKGROUND

A microturbine engine (or "microturbine") is a type of combustion turbine engine that produces both heat and power on a relatively small scale. The component common to all microturbines is a small gas turbine engine, typically producing less than 500 kilowatts (kW) of power. This type of gas turbine comprises a single or multi-stage compressor, a combustor for liquid and/or gaseous fuels, a single or multi-stage turbine, and a power output shaft supported by a bearing system. Typically, the gas turbine is integrated with an electric generator and/or heat recovery system. Systems also generally include a housing and power and control electronics.

Microturbines designed for use with liquid fuels typically employ a prevaporizing combustor which allows liquid fuel to be vaporized in a small amount of air prior to entering the combustion zone of the microturbine combustor. However, current microturbines typically use hot combustion products to directly heat the fuel stream before it is injected into the combustor. Such systems do not permit adequate control of the heat transfer into the fuel, allowing its temperature to vary considerably during operation. This often causes fuel coking and increased combustor maintenance requirements.

Microturbines exist in a variety of sizes and can be significantly smaller and lighter than competing systems powered by reciprocating engines. However, current small, i.e., less than 25 kW, microturbines are generally inefficient and have very short lifetimes, typically less than 100 hours.

SUMMARY OF THE INVENTION

The present invention is directed to a microturbine 100 for powering a generator 200. While the microturbine 100 of the present invention is specifically directed to powering a generator, it is well within the scope of the present invention to apply the microturbine 100 to other uses.

The present invention is directed to a microturbine 100 for powering a generator 200 comprising a centrifugal compressor 300 comprising a compressor rotor 302, a diffuser 303 and a volute 305 to provide a continuous flow of compressed air, a prevaporizing combustor 400 for mixing the compressed air with fuel 452, wherein the compressed air is mixed with fuel 452 in a specific ratio to produce a high-pressure hot gas; and a combustor air bypass 402 to control the compressed air from the centrifugal compressor 400, the combustor air bypass 402 comprising a duct 404 connecting the centrifugal compressor 300 with the combustor exit 418 of the prevaporizing combustor 400. The present invention further includes a radial inflow compressor turbine 112 to extract power from the high-pressure hot gas produced by the prevaporizing combustor 400 and an axial free power turbine 109 to extract power from the high-pressure hot gas exiting the radial inflow compressor turbine 112 to power an attached load, e.g., a generator 200.

The microturbine 100 includes a power output shaft 206 having a first end 207 and a second end 209 and supported by a plurality of bearings 208, 210. A free power turbine 109 is mounted on the first end 207 of the power output shaft 206. The free power turbine 109 receives high pressure, hot gas 450 from the gas generator turbine 112, thereby causing the power output shaft 206 to rotate.

The present invention is further directed to a microturbine 100 for powering a generator 200, comprising a housing 102; a first rotatable shaft 105 mounted through the housing 102, the rotatable shaft 105 having a first end 106 and a second hot exhaust end 108, wherein the compressor 300 is mounted to the first end 106 of the rotatable shaft 105; a centrifugal compressor 300 comprising a compressor rotor 302 to provide a continuous flow of compressed air; a prevaporizing combustor 400 for mixing the compressed air with fuel, wherein the compressed air is mixed with fuel in a specific ratio to produce a high-pressure hot gas, and wherein the radial inflow compressor turbine 112 receives the high-pressure hot gas 450 produced from the prevaporizing combustor 400 thereby causing the microturbine rotatable shaft 105 to rotate; a combustor air bypass 402 to control the compressed air from the centrifugal compressor 300, the combustor air bypass 402 comprising a duct 404 connecting the centrifugal compressor 300 with the exit 418 of the prevaporizing combustor 400; a generator 200 having a stator 202 installed in the housing and a rotor 204 fixed to the second end 209 of the power output shaft 206 so as to be rotated together; and a generator cooling system 500 to provide cooling air to the generator 200, the system 500 comprising a passage 502 surrounding the generator 200, the passage 502 having a first end 504 and a second end 506, wherein the first end 504 is open to the atmosphere and the second end 506 is open to the discharge area at the exit of the axial free power turbine 109 to create a cool air draw from the first end 504 of the passage 502 to the second end 506 of the passage 502, and an exhaust diffuser 600 for expelling air along with microturbine discharge gas.

The present invention is further directed to a microturbine 100 for powering a generator 200 comprising a housing 102; a first rotatable shaft 105 mounted through the housing 102, the rotatable shaft 105 having a first end 106 and a second hot exhaust end 108; a power output shaft 206 having a first end 207 and a second end 209; a centrifugal compressor 300 comprising a compressor rotor 302 to provide a continuous flow of compressed air; a prevaporizing combustor 400 for mixing the compressed air with fuel, wherein the compressed air is mixed with fuel in a specific ratio to produce a high-pressure hot gas, wherein the compressor 300 is mounted to the first end 106 of the rotatable shaft 105 and wherein the rotatable shaft 105 receives the high-pressure hot gas produced from the prevaporizing combustor 400 thereby causing the microturbine rotatable shaft 105 to rotate, and wherein the prevaporizing combustor 400 comprises a prevaporizing zone 406 for mixing compressed air and fuel to an air/fuel mixture, wherein the prevaporizing zone 406 includes a first compressed air channel 407 and a second fuel channel 411, and a combustion zone 408 wherein the combustion zone 408 includes a compressed air channel 409 for receiving compressed air, the combustion zone 408 comprising a primary zone 430 for mixing the air/fuel mixture from the prevaporizing zone 406 with compressed air in the combustion zone 408 to produce a combustion product, wherein the primary zone 430 comprises a liner wall 436 containing openings 434 for air flow, a splash ring 438 and effusion cooling holes 442 to produce an insulating film of air to flow along the liner wall 436, and an igniter 414 to initiate a reaction of combustion gases, and a dilution zone 432 for receiving the combustion product of the primary zone 430, wherein the dilution zone 432 comprises liner wall openings 443 for air flow to reduce the temperature of combustion gases. The microturbine 100 further includes a combustor air bypass 402 to control the compressed air from the centrifugal compressor 400, the combustor air bypass 402 comprising a duct 404 connecting the centrifugal compressor 300 with the prevaporizing combustor 400. The microturbine 100 also includes a generator 200 having a stator 202 installed in the housing and a rotor shaft 204 fixed to the second end 209 of the power output shaft 206 so as to be rotated together; and a generator cooling system 500 to provide cooling air to the generator 200, the system 500 comprising a passage 502 surrounding the generator 200, the passage 502 having a first end 504 and a second end 506, wherein the first end 504 is open to the atmosphere and the second end 506 is open to the discharge area of the axial free power turbine 209 to create a cool air draw from the first end 504 of the passage 502 to the second end 506 of the passage 502, and an exhaust diffuser 600 for expelling air along with microturbine discharge gas.

The microturbine 100 of the present invention has features which distinguish it from the prior art. Most notable are the generator cooling system 500, prevaporizing combustor 400 and combustor air bypass 402 systems.

To meet current design requirements, the generator 200 is placed on the hot exhaust end of the microturbine 100, adjacent the exhaust diffuser 600. This necessitates a unique method of removing the generator's waste heat. The ejector cooling scheme uses energy in the hot exhaust gas stream to entrain a flow of ambient air that cools the generator 200.

The prevaporizing combustor 400 of the present invention allows liquid fuel to be vaporized in a small amount of air in the prevaporizing zone 406 prior to entering the combustion zone 408. This promotes high combustion efficiency in a wide range of ambient conditions and produces a compact flame zone, reducing the required size of the prevaporizing combustor 400. While other small microturbines do employ prevaporizing combustion systems, they typically use hot combustion products to directly heat the fuel stream before it is injected into the combustor. Such systems do not permit adequate control of the heat transfer into the fuel, allowing its temperature to vary considerably during operation. This often causes fuel coking and increased combustor maintenance requirements. The prevaporizing combustor 400 of the present invention avoids this issue by vaporizing the fuel in a dedicated section of the combustor, upstream of the flame zone. Both turbine exhaust heat and electrical heat may be used to raise the fuel's temperature prior to injection. The high-temperature fuel has an elevated vapor pressure, i.e., volatility, permitting complete, rapid vaporization in the surrounding air. The system design permits accurate control over the fuel's temperature, preventing coking and improving component life and efficiency.

The prevaporizing combustor 400 of the present invention is designed to be highly efficient and compact. Fuel/air mixing and combustion zone equivalence ratio (the ratio of actual to stoichiometric fuel/air ratio) are designed to produce optimal performance at full-power conditions. Pressure, temperature, and overall fuel/air ratio, however, do not remain constant over the engine's operating range. These factors have the potential to negatively affect combustor performance at reduced-power conditions. The combustor air bypass 402 system alleviates this problem. It allows a controlled fraction of the compressor discharge air to bypass the combustor 400 during reduced-power operation. This prevents excessively high air velocities and low equivalence ratios, which would reduce flame stability and combustor performance.

A final unique aspect of the microturbine 100 of the present invention is its small size, typically in a volume of approximately 1-5 $ft^3$, preferably 2 $ft^3$, weighing between approximately 20 and 75 lbs, preferably about 35 lbs, and producing from about 5-25 kW, preferably about 10 kW of electrical power. While microturbines of this size do exist, they are generally inefficient (5 percent, based on the fuel's Lower Heating Value) and have very short lifetimes (under 100 hours). The microturbine 100 of the present invention is designed for a thermal efficiency of around 15% and a lifetime over 1,000 hours.

The objects and advantages of the invention will appear more fully from the following detailed description of the preferred embodiment of the invention made in conjunction with the accompanying drawings.

DETAILED DESCRIPTION OF THE INVENTION

Figure 1:
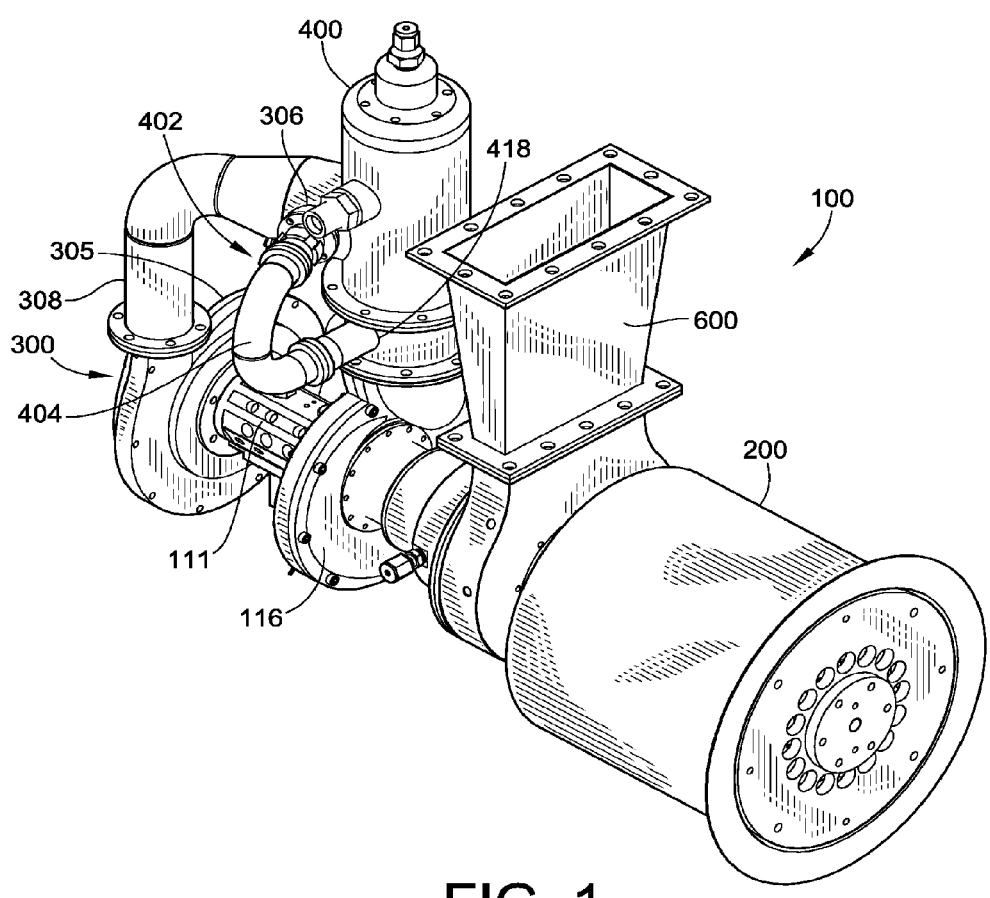
FIG. 1 is a perspective view of the micro gas turbine generator system of the present invention.
Figure 2:
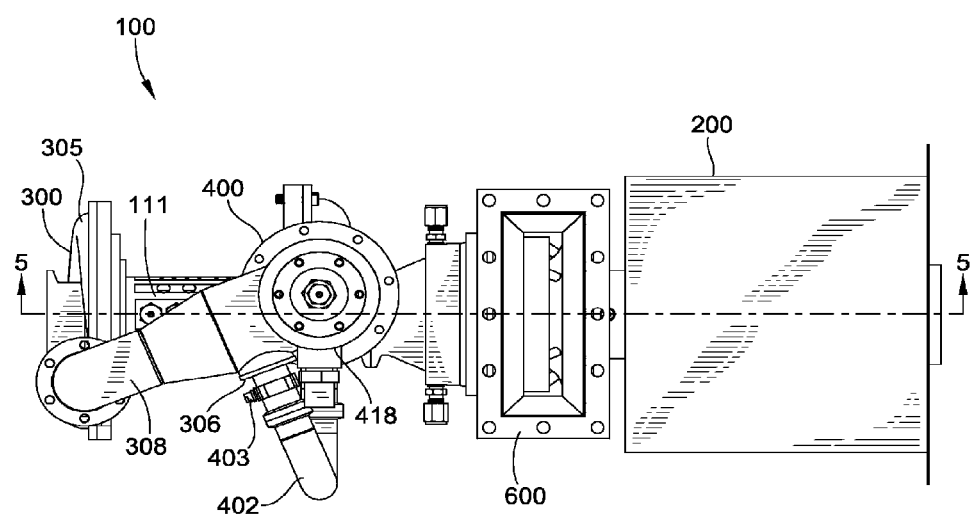
FIG. 2 is a top plan view of the micro gas turbine generator system.
Figure 3:
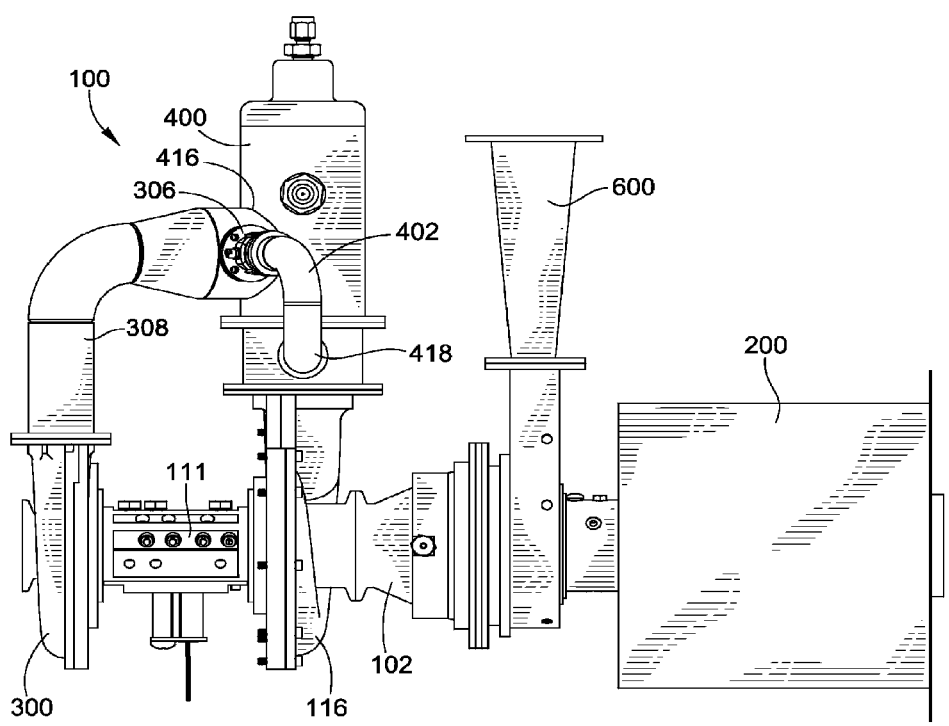
FIG. 3 is a right plan view of the micro gas turbine generator system.
Figure 4:
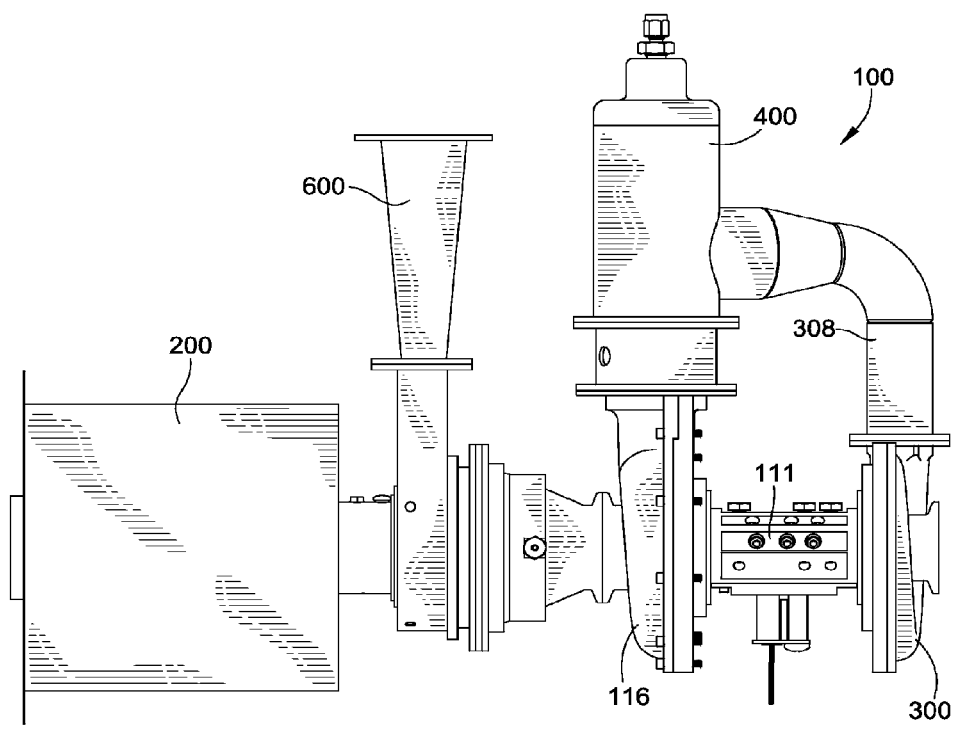
FIG. 4 is a left plan view of the micro gas turbine generator system.

FIG. 1 is a perspective view illustrating the microturbine 100 in combination with a generator 200 of the present invention. The perspective view shows the following component parts of the micro gas turbine generator system:

As illustrated in FIGS. 1-5, the microturbine engine (or "microturbine 100") of the present invention includes a single or multi-stage compressor 300, a prevaporizing combustor 400 for liquid and/or gaseous fuels, a single or multi-stage gas generator turbine 112, and a gas generator shaft 105 supported by a bearing system 110 housed within a bearing tunnel 111. The microturbine 100 further includes a single or multi-stage power turbine 109 and a power output shaft 206 supported by a bearing system 210, 212. Typically, the gas turbine 100 is integrated with an electric generator 200 and/or heat recovery or generator cooling system 500. The systems also generally include a housing 102 and power and control electronics known to the art.

The Centrifugal Compressor 300:

The centrifugal compressor 300 is a rotating, airfoil based machine which draws in ambient air, referenced by number 301, and expels the air in a radially outward flow from the axis of rotation. This outward flow path is driven by a compressor rotor 302, which imparts energy to the flow in the form of increased pressure and velocity. A downstream diffuser 303 reduces the velocity of the air flow leaving the compressor rotor 302, converting kinetic energy to a further increase in pressure. A diffuser is an aerodynamic device that is designed to control the characteristics of the air flow. Using a diffuser to control the velocity of the compressor discharge air promotes a uniform introduction of the air to the prevaporizing combustor 400.

A volute 305 collects the high-pressure air flow into a single outlet duct 308 connected to the compressor 300 at outlet 306. This process produces a continuous flow of compressed air and has the benefits of high efficiency, robustness, and large mass flow capacity. The pressurized air is then passed from the diffuser 303 to the prevaporizing combustor 400.

The Prevaporizing Combustor 400

Figure 6:
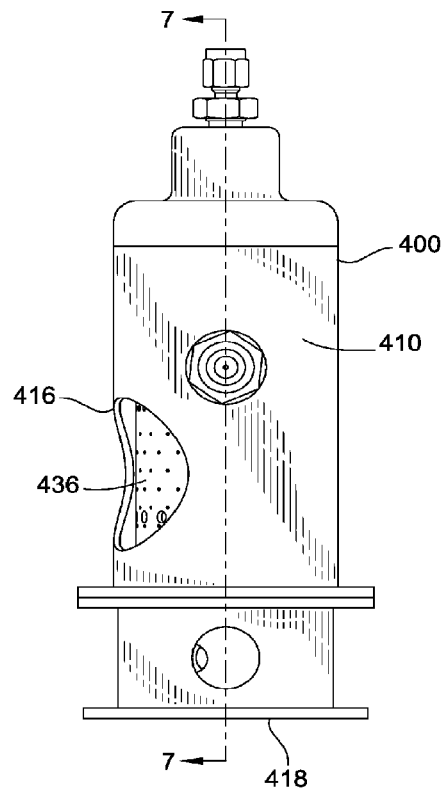
FIG. 6 is a side plan view of the prevaporizing combustor of the present invention.
Figure 7:
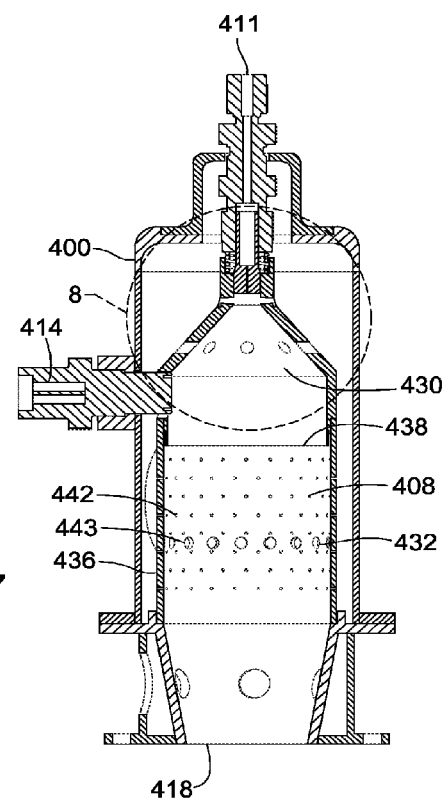
FIG. 7 is a cross-sectional view of the prevaporizing combustor of FIG. 6 taken along lines 7-7 of FIG. 6.
Figure 8:
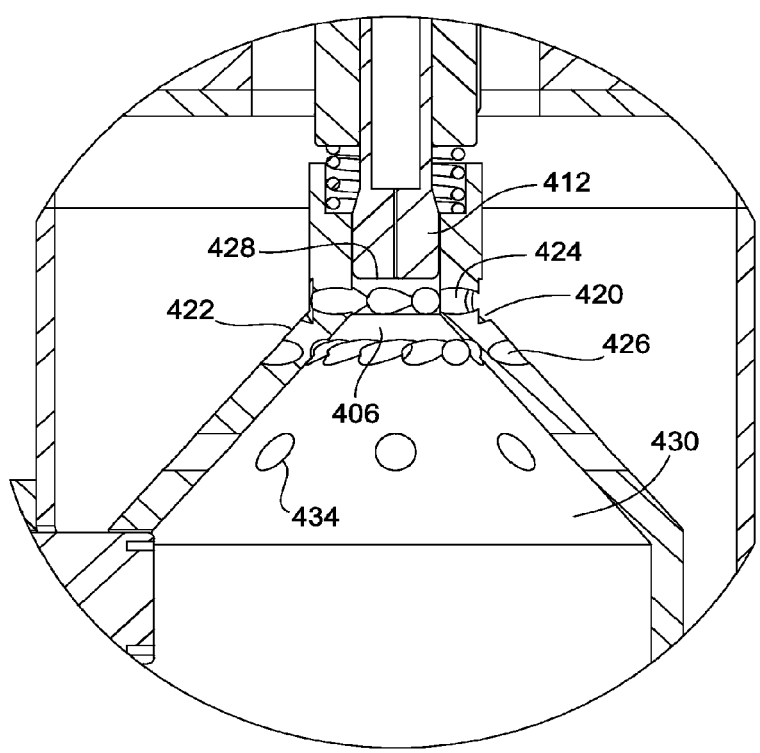
FIG. 8 is a cross-sectional detailed view of the prevaporizing zone and the combustion zones of the prevaporizing combustor from the area designated 8 in FIG. 7.

As illustrated in FIGS. 6-8, the pressurized air from the diffuser 303 is then passed into the prevaporizing combustor 400 where heat and fuel are added. The microturbine 100 of the present invention employs a prevaporizing combustor zone 406 in the prevaporizing combustor 400, as illustrated in FIGS. 7 and 8. The prevaporizing combustor zone 406 allows liquid fuel to be vaporized in a small amount of the air prior to entering the combustion zone 408 of the prevaporizing combustor 400. This promotes high combustion efficiency in a wide range of ambient conditions and produces a compact flame zone, reducing the required size of the prevaporizing combustor 400.

The prevaporizing combustor 400 is a can-type combustor, comprising a prevaporizing zone 406 and a combustion zone 408. A can combustor is a self-contained cylindrical combustion chamber with the combustor case 410, incorporating a fuel injector, i.e., spray nozzle 412, igniter 414, liner wall 436 and the combustor case 410. The inputs to the prevaporizing combustor 400 are high-pressure air produced by the compressor 300 at the combustor inlet 416, and fuel 452, illustrated in FIG. 9, which has been heated to an elevated temperature by the exhaust heat exchanger 602 and/or supplemental electric fuel heater 150 (illustrated in FIG. 9). Both gaseous and liquid fuels can be used, including but not limited to, diesel, gasoline, naphtha, propane, methane, natural and synthesis gas, i.e., syngas.

The combustion process that takes place within the prevaporizing combustor 400 produces a gas temperature of approximately 900° C. at the combustor exit 418 and the gas generator turbine inlet 122. This inlet temperature is typical of gas turbine engines with uncooled turbine components. The prevaporizing combustor 400 may include a suitable catalyst, such as for example, platinum or palladium, which is capable of combusting the fuel-air mixture.

Prevaporizing Zone 406: In the prevaporizing combustor 400, approximately 10-30%, and preferably about 20% of the air flow, illustrated by line 407, produced by the centrifugal compressor 300 enters the prevaporizing zone 406 through a tangential-entry swirler 420. The tangential-entry swirler 420 contains a plurality of air inlet jets 422, arranged concentrically around the central axis of the prevaporizing combustor 400. As illustrated, there is a first row 424 and a second row 426 of jets. These jets 422 are oriented tangentially, thereby producing a swirling air flow with a high swirl number (SN>0.6 as defined by the ratio of axial flux of tangential momentum to axial flux of axial momentum) in the conical prevaporizing zone 406. At the center of the tangential-entry swirler 420, a fuel atomizer nozzle 428 produces a highly-atomized spray of heated liquid fuel. This fuel mixes with the swirling air and rapidly vaporizes, producing a gaseous mixture suitable for combustion.

Unlike in other microturbine combustors, the fuel vaporization process employed in the prevaporizing combustor 400 of the present invention is highly controlled. The liquid fuel is heated prior to injection through the fuel atomizer nozzle 428 in order to increase its equilibrium vapor pressure and allow it to rapidly vaporize in a small amount of air. The temperature of the fuel, however, is maintained below its coking temperature. This prevents pyrolysis, which could lead to fouling of the fuel nozzle 428 and reduced combustion efficiency. Further, the tangential-entry swirler 420 is designed to produce a highly turbulent mixing region and central recirculation zone that allows complete vaporization of the fuel prior to entering the combustion zone 408.

In an alternate embodiment of the present invention, the fraction of the compressor discharge air 407 entering the prevaporizing zone 406 of the prevaporizing combustor 400 is pre-heated. This can be accomplished by use of an additional exhaust heat exchanger 602 and/or a supplemental electric air heater 150. Pre-heating the air that enters the prevaporizing zone 406 allows effective fuel vaporization over an extended range of operating conditions. Specifically, pre-heating this air may be necessary at low ambient temperatures.

The Combustion Zone 408: The combustion zone 408 of the prevaporizing combustor 400 receives between about 70% and 90%, preferably about 80% of the air flow, represented by line 409 in FIG. 9, produced by the centrifugal compressor 300 and is divided into the primary zone 430 and the dilution zone 432.

The Primary Zone 430: In the primary zone 430, the gaseous fuel mixture produced in the prevaporizing zone 406 mixes with compressor discharge air and undergoes a combustion reaction. Air enters the primary zone 430 through openings 434 in the combustor liner wall 436. The jets produced by these primary air openings 434 promote thorough fuel/air mixing and strong flame stabilization. In the vicinity of the flame, a splash ring 438 and effusion cooling holes 442 produces an insulating film of air that flows along the liner wall 436 and protects it from the hot combustion products. An electric igniter 414 is provided in the primary zone 430 to initiate the combustion reaction.

The Dilution Zone 432: Downstream of the primary zone 430, combustion products enter the dilution zone 432. In the dilution zone 432, additional compressor discharge air enters the prevaporizing combustor 400 through concentrically-arranged dilution air jets 443 in the liner wall 436. The dilution air jets 443 reduce the temperature of the hot combustion gases and halt thermally-driven chemical processes, such as the production of nitrogen oxides. The dilution zone 432 also includes effusion cooling holes 442. The configuration of the combustion zone 408 is typical of designs known to the art.

The Combustor Air Bypass 402

The purpose of the combustor air bypass 402 is to maintain high combustor performance at reduced-power conditions. It consists of a duct 404 connecting the discharge outlet 306 of the centrifugal compressor 300 with the discharge of the prevaporizing combustor 400 at port 418. Inside the duct 402 is a butterfly valve 403, illustrated in FIG. 2, a device known to the art, which serves to vary the air flow permitted through the duct 402. An external servomotor (not shown) is used to control the position of the valve and, therefore, the fraction of compressor discharge air bypassing the prevaporizing combustor 400. It is necessary for air to bypass the prevaporizing combustor 400 in off-design (reduced-power) operation because pressure, temperature, and overall fuel/air ratio vary under these conditions. Allowing air to bypass the prevaporizing combustor 400 helps to maintain an optimal equivalence ratio and appropriate air velocities in the primary zone 430. While the combustor air bypass 402 is similar to systems used on some larger gas turbines, it is unique in the microturbine 100 of the present invention.

The Radial Inflow Compressor or Gas-Generator Turbine 112

The radial inflow compressor turbine (also called the gas-generator turbine) 112 extracts power from the high-pressure, hot gas produced by the prevaporizing combustor 400. The hot gas enters the radial inflow compressor turbine 112 through a volute 116, which distributes the flow uniformly among a plurality of nozzles 118 arranged around the periphery of the turbine rotor 104. The nozzles 118 increase the velocity of the high-pressure, hot gas and direct it inward toward the axis of rotation. This high-velocity gas then flows through the turbine rotor 104, which rotates at between about 150,000 and 200,000 rpm, preferably 175,000 rpm. The gas imparts energy to the turbine rotor 104 as its pressure and temperature decrease. This energy is transmitted to the compressor 300 by the radial inflow compressor turbine 112. A radial inflow compressor turbine 112 is used because of its robustness and ability to extract a large amount of power in a single stage.

The Axial Free Power Turbine 109

The axial free power turbine 109 rotates at a speed between about 70,000 and 90,000 rpm, preferably 81,000 rpm to accommodate the desired lower rotational speed of the generator 200. An axial power turbine 109 is a rotating airfoil-based machine in which air flows parallel to the axis of rotation. In an axial turbine, a set of stationary nozzles 118 first imparts a large tangential velocity to a flow of high-pressure, hot gas. This hot gas then flows through the power turbine 109, in which its pressure and velocity decrease. During this process, the hot gas imparts energy to the power turbine rotor 113, which is transmitted to the generator 200 through the power output shaft 206. The axial power turbine 109 is used in the microturbine 100 of the present invention because it provides high efficiency and a direct flow path.

High Speed Bearing Support Systems 110, 208, 210

Both the gas generator shaft 105 and power output shaft 206 are supported on high-speed bearing support systems 110, 208, 210. These systems employ angular-contact ball bearings, which are able to support radial loads, as well as the axial thrust loads produced by the turbomachinery. These bearings are located in fixed housings 111, 212, 214, which serve to hold rotating components in precise alignment. Bearings are pre-loaded by spring washers (not shown) to maintain proper contact between the balls and raceways under all operating conditions. Lubrication and cooling is provided by oil jets 119, 213, 215, and the oil is removed through a sump 120, 216, 218. Labyrinth seals, a type of non-contact rotating seal known to the art, prevent oil from escaping where the rotating shafts 105, 206 exit the fixed housings 111, 212, 214. The high speed bearing support systems 110, 208, 210 used in the present invention are based on well-established design methodologies and are similar to other high-speed rotating assemblies.

The Generator Cooling System 500

Figure 5:
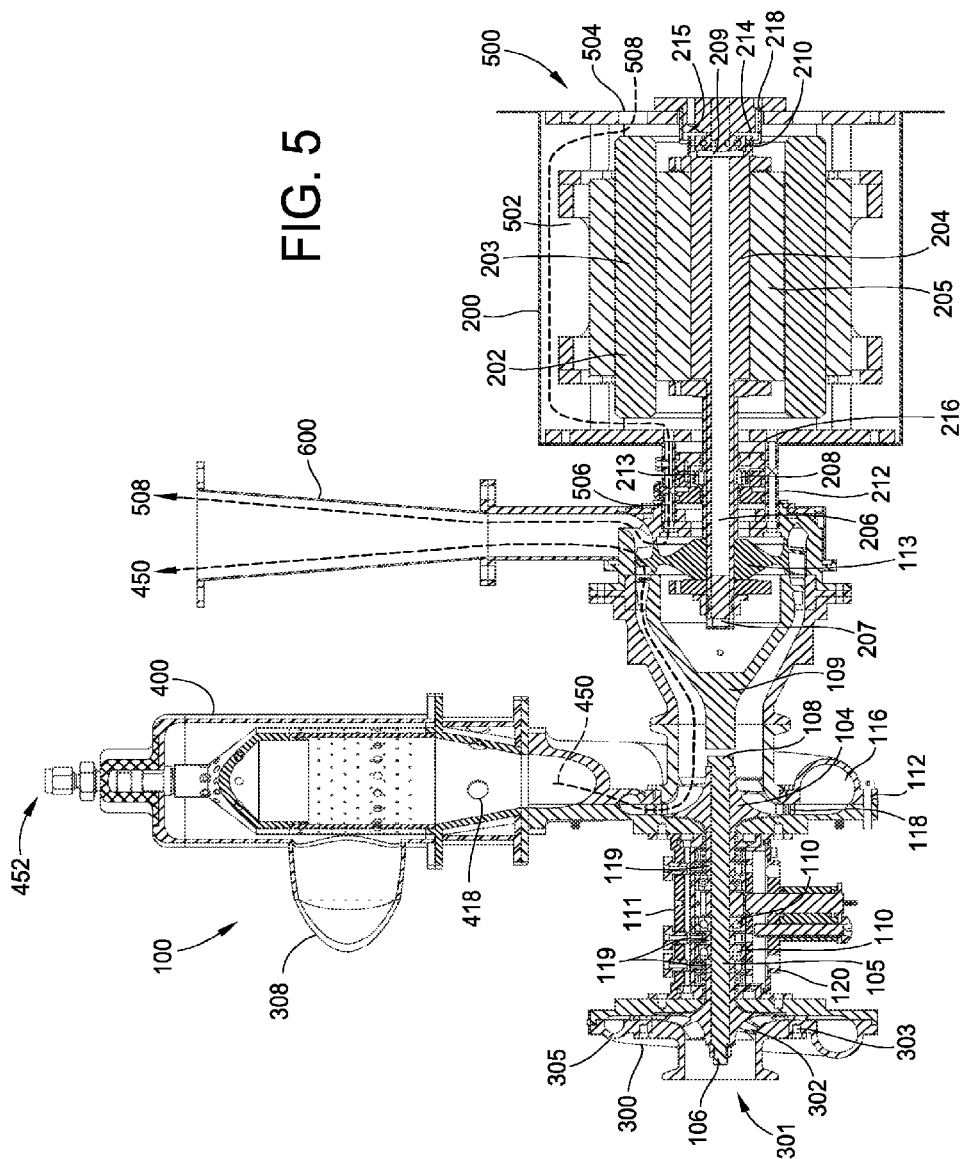
FIG. 5 is a cross-sectional view of the micro gas turbine generator system taken along lines 5-5 of FIG. 2.
Figure 9:
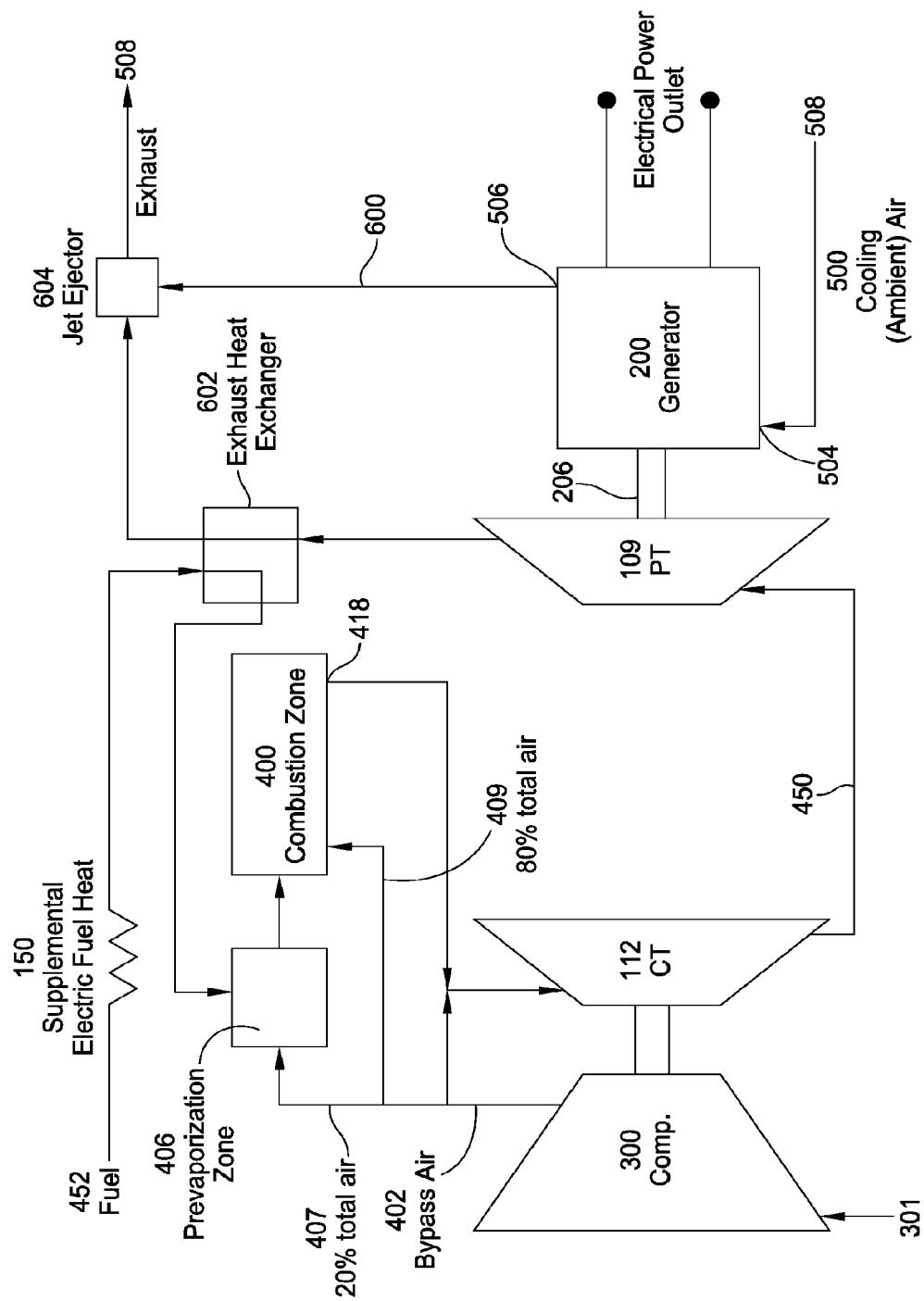
FIG. 9 is a cycle diagram illustrating the power, fuel and air flow paths of the microturbine generator system of the present invention.

Illustrated in FIGS. 5 and 9, the reason the ejector cooling scheme is incorporated is to provide cooling air that flows over the outside of the generator 200 from the right of FIG. 5 to absorb and take heat away from the generator 200.

In the microturbine generator system of the present invention, ambient air 508 flows through a passage 502 surrounding the generator 200. This passage is open on one end 504 to the atmosphere and on the other end 506 to the discharge area of the power turbine rotor 113. Since the pressure at the power turbine discharge 506 is slightly below atmospheric, the cool atmospheric air is drawn in and over the generator 200. This air cools the generator 200 and is then expelled along with the turbine exhaust gas 450 through the exhaust diffuser 600. Thus, the flow of cool air 508, which is 10% of the main flow of air, flows over the generator 200 to cool the generator 200 and keep the generator 200 at an operational temperature. This is the novel Ejector Cooling Scheme.

The Generator 200

The generator 200 is a generally known generator which includes an interior rotor 204 and exterior stator 202, similar to any generator. The stator coils (not shown) on the stator 202 on the outside do not move and the interior rotor 204 with magnets 205 rotates. The stator and rotor coils are both placed in the housing 102. The housing 102 has some means on the outside for increasing heat transfer from inside the generator 200 to the air that is flowing over the generator 200.

In any microturbine generator system, shaft power must be transmitted from the microturbine 100 to the electric generator 200. This is commonly accomplished through either a direct-drive or a gear-reduction configuration.

In a direct-drive configuration, the rotor 204 of the generator 200 is coupled directly to the second end 209 of the power output shaft 206. This means the generator rotor 204 rotates synchronously with the turbomachinery on the output shaft 206 (at least one turbine stage, but possibly all turbine and compressor stages). By contrast, a gear-reduction configuration places a gearbox between the microturbine's output shaft and the generator rotor. This allows the generator rotor 204 to rotate at a lower speed than the microturbine's output shaft 104. A direct-drive configuration is preferable to a gear-reduction configuration for several reasons. These include higher efficiency, lower complexity, and greater robustness. Further, a generator 200 designed to operate at the high rotational speed required in the direct-drive configuration can be smaller and lighter than a lower-speed machine connected through a gearbox. However, the rotational speed of a typical electric generator is limited by strength and efficiency constraints. This makes the direct-drive configuration difficult to implement in very small microturbine generator systems, where the microturbine engine's output shaft 206 rotates at a very high speed.

The microturbine generator system 100 of the present invention is novel because it accommodates the design requirements of both the microturbine 100 and the electrical generator 200. The microturbine 100 is designed with two shafts 105, 206. The gas generator shaft 105 connects the compressor 300 and gas generator turbine 112 and rotates at between 150,000 and 200,000 rpm, preferably approximately 175,000 rpm. Because this speed would be excessive for the generator 200, a second power output shaft 206 is used to couple a free power turbine 109 to the rotor 204 of the generator 200 at the second end 209 of the power output shaft 206. This power output shaft 206 rotates between about 70,000 and 90,000 rpm, preferably approximately 81,000 rpm. The use of a separate, lower-speed power output shaft 206 permits a reliable, efficient design for the generator 200 while still allowing a direct-drive configuration to be used.

A technical challenge created by the use of a free power turbine design is that it places the power output shaft 206 of the microturbine 100 in the vicinity of the hot exhaust gas, represented by phantom line 450. This also places the generator 200 in the vicinity of the hot exhaust gas 450. This is in contrast to a single-shaft configuration, which would allow the generator 200 to be placed in the cool inlet air stream.

Since the generator 200 must be maintained at an operational temperature, it must be shielded from the hot exhaust gas 450 and provided with cooling air. The generator cooling system 500 has been developed to serve this function.

FIG. 9 is a cycle diagram of the microturbine generator system. The diagram shows the components included in the system, as well as power, fuel, and air flow paths. The schematic shows the following component parts of the microturbine generator system: a microturbine 100, comprising: a centrifugal compressor 300, a prevaporizing combustor 400, a combustor air bypass 402, a radial compressor turbine 104, an axial free power turbine 109, a generator cooling system 500, a gas generator shaft 105, a power turbine 109 and a high speed generator 200.

10 kW Microturbine Generator System Overview

The microturbine generator system of the present invention employs a microturbine 100 to convert the energy contained in a liquid fuel to shaft power. This shaft power is then converted by the generator 200 into electrical power.

Referring to FIGS. 5 and 9, the cycle on which the generator 200 operates is as follows:

First, a stream of ambient air, represented by line 301, enters the centrifugal compressor 300, where its pressure is increased to several times atmospheric.

The air, now at an elevated pressure and temperature, flows into the prevaporizing combustor 400. Approximately 80 percent of the air 409 is admitted into the combustion zone 408 of the prevaporizing combustor 400, while 20 percent of the air 407 enters the fuel prevaporizing zone 406 of the prevaporizing combustor 400. The air directed to the prevaporizing zone 406 joins with the fuel stream 452, which has been heated by the exhaust heat exchanger 602 and/or a supplemental electric fuel heater 150.

The heated air and fuel combine to form a gaseous mixture, which is directed into the combustion zone 408 of the prevaporizing combustor 400. In the combustion zone 408, the fuel/air mixture joins with the remainder of the compressor discharge air and undergoes a combustion process.

At reduced-power conditions, up to 30 percent of the compressor discharge air may be allowed to bypass the prevaporizing combustor 400. The combustor air bypass 402 allows compressor discharge air to flow directly to the combustor exit 418 without participating in the combustion or prevaporization processes. This improves combustion performance during off-design engine operation.

At the exit 418 of the prevaporizing combustor 400, the products of combustion are at an elevated temperature and pressure. These hot gases flow into the radial-inflow compressor turbine 112. The expansion of hot gas through the radial inflow compressor turbine 112 produces power, which is transmitted through the gas generator shaft 105 to the compressor 300. The gas further expands through the power turbine 109, where the second power output shaft 206 transmits power to the generator 200. The generator 200 then converts this shaft power to electrical power.

Prior to exiting the microturbine 100 through the exhaust diffuser 600, the turbine exhaust gas undergoes two processes. First, it transfers heat into the fuel stream via the exhaust heat exchanger 602. The turbine exhaust gas then enters the jet ejector 604, where its kinetic energy is used to entrain a flow of ambient air 508 to remove waste heat from the generator 200. The turbine exhaust gas 450 then mixes with this ambient air and is expelled into the atmosphere via the exhaust diffuser 600.

Any version of any component or method step of the invention may be used with any other component or method step of the invention. The elements described herein can be used in any combination whether explicitly described or not.

All combinations of method steps as used herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

Further, there are several indications of rotational speeds in the disclosure. For example, the rotation of the turbine rotor 104 is listed at 175,000 rpm. The rotation of the axial free power turbine 109 is listed at 81,000 rpm. It is to be noted that these rotational speeds are preferred speeds and are subject to alteration depending on the environment and power output level of the microturbine engine and other factors by a factor typically between about +/−10%.

All patents, patent publications, and peer-reviewed publications (i.e., "references") cited herein are expressly incorporated by reference in their entirety to the same extent as if each individual reference were specifically and individually indicated as being incorporated by reference. In case of conflict between the present disclosure and the incorporated references, the present disclosure controls.

The devices, methods, compounds and compositions of the present invention can comprise, consist of, or consist essentially of the essential elements and limitations described herein, as well as any additional or optional steps, ingredients, components, or limitations described herein or otherwise useful in the art.

While this invention may be embodied in many forms, what is described in detail herein is a specific preferred embodiment of the invention. The present disclosure is an exemplification of the principles of the invention is not intended to limit the invention to the particular embodiments illustrated. It is to be understood that this invention is not limited to the particular examples, process steps, and materials disclosed herein as such process steps and materials may vary somewhat. It is also understood that the terminology used herein is used for the purpose of describing particular embodiments only and is not intended to be limiting since the scope of the present invention will be limited to only the appended claims and equivalents thereof.

The invention claimed is:

1. A microturbine for powering a generator comprising:
a. a centrifugal compressor comprising a compressor rotor, a diffuser and a volute to provide a continuous flow of compressed air;
b. a prevaporizing combustor for mixing the compressed air with fuel, wherein the compressed air is mixed with fuel in a specific ratio to produce a high-pressure hot gas, the prevaporizing combustor having an exit opening, wherein the prevaporizing combustor comprises:
   i. a prevaporizing zone for mixing compressed air and fuel to an air/fuel mixture, wherein the prevaporizing zone includes a first compressed air channel and a second fuel channel, and ii. a combustion zone wherein the combustion zone includes a compressed air channel for receiving compressed air, the combustion zone comprising:
1. a primary zone for mixing the air/fuel mixture from the prevaporizing zone with compressed air in the combustion zone to produce a combustion product, and
2. a dilution zone for receiving and cooling the combustion product of the primary zone;
c. a combustor air bypass to control the compressed air from the centrifugal compressor, the combustor air bypass comprising a duct connecting the centrifugal compressor with the exit opening of the prevaporizing combustor;
d. a radial inflow compressor turbine to extract power from the high-pressure hot gas; and
e. an axial free power turbine to extract power from the high-pressure hot gas.

2. The microturbine of claim 1, further comprising an exhaust heat exchanger to preheat the fuel.

3. The microturbine of claim 1, further comprising a supplemental electric fuel heater to preheat the fuel.

4. The microturbine of claim 1 wherein the prevaporizing zone further includes a tangential-entry swirler including a plurality of air inlet jets.

5. The microturbine of claim 1 wherein the primary zone comprises:
a. a liner wall containing openings for air flow,
b. a splash ring and effusion cooling holes to produce an insulating film of air to flow along the liner wall, and
c. an igniter to initiate a reaction of combustion gases.

6. The microturbine of claim 5 wherein the dilution zone comprises a liner wall containing openings for air flow to reduce the temperature of combustion gases.

7. The microturbine of claim 1 further comprising:
a. a housing;
b. a first rotatable shaft mounted through the housing, the first rotatable shaft having a first end and a second hot exhaust end, wherein the compressor is mounted to the first end of the rotatable shaft and wherein the radial inflow compressor turbine is mounted to the second end of the rotatable shaft, and wherein the radial inflow compressor turbine receives the high-pressure hot gas produced from the prevaporizing combustor thereby causing the microturbine rotatable shaft to rotate;
c. a second rotatable power output shaft having a first end and a second end, wherein the axial free power turbine is mounted to the first end of the second power output shaft to extract power from the high-pressure hot gas.

8. The microturbine of claim 7 further comprising:
a. an electric generator having a stator installed in the housing and a rotor fixed to the second power output shaft so as to be rotated together; and
b. an generator cooling system to provide cooling air to the generator, the system comprising:
i. a passage surrounding the generator, the passage having a first end and a second end, wherein the first end is open to the atmosphere and the second end is open to the discharge area of the second end of the axial free power turbine to create a cool air draw from the first end of the passage to the second end of the passage, and
ii. an exhaust diffuser for expelling air along with microturbine discharge gas.

9. A microturbine for powering a generator comprising:
a. a housing;
b. a first rotatable shaft mounted through the housing, the rotatable shaft having a first end and a second hot exhaust end;
c. a second power output shaft;
d. a centrifugal compressor comprising a compressor rotor, a diffuser and a volute to provide a continuous flow of compressed air;
e. a prevaporizing combustor for mixing the compressed air with fuel, wherein the compressed air is mixed with fuel to produce a high-pressure hot gas, wherein the centrifugal compressor is mounted to the first end of the rotatable shaft and wherein the radial inflow compressor turbine is mounted to the second end of the rotatable shaft and receives the high-pressure hot gas produced from the prevaporizing combustor thereby causing the microturbine rotatable shaft to rotate, wherein the prevaporizing combustor includes an exit opening;
f. a combustor air bypass to control the compressed air from the centrifugal compressor, the combustor air bypass comprising a duct connecting the centrifugal compressor with the exit opening in the prevaporizing combustor;
g. a radial inflow compressor turbine to extract power from the high-pressure hot gas;
h. an axial free power turbine to extract power from the high-pressure hot gas;
i. a generator having a stator installed in the housing and a rotor fixed to the second power output shaft so as to be rotated together; and
j. a generator cooling system to provide cooling air to the generator, the system comprising:
i. a passage surrounding the generator, the passage having a first end and a second end, wherein the first end is open to the atmosphere and the second end is open to the discharge area of the axial free power turbine to create a cool air draw from the first end of the passage to the second end of the passage, and
ii. an exhaust diffuser for pumping and expelling air from the generator along with microturbine discharge gas.

10. The microturbine of claim 9, wherein the prevaporizing combustor comprises:
a. a prevaporizing zone for mixing compressed air and fuel to an air/fuel mixture, wherein the prevaporizing zone includes a first compressed air channel and a second fuel channel, and
b. a combustion zone wherein the combustion zone includes a compressed air channel for receiving compressed air, the combustion zone comprising:
i. a primary zone for mixing the air/fuel mixture from the prevaporizing zone with compressed air in the combustion zone to produce a combustion product, wherein the primary zone comprises:
1. a liner wall containing openings for air flow,
2. a splash ring and effusion cooling holes to produce an insulating film of air to flow along the liner wall, and
3. an igniter to initiate a reaction of combustion gases, and
ii. a dilution zone for receiving the combustion product of the primary zone, wherein the dilution zone comprises a liner wall containing openings for air flow to reduce the temperature of combustion gases.

11. The microturbine of claim 9, further comprising an exhaust heat exchanger to preheat the fuel.

12. The microturbine of claim 9, further comprising a supplemental electric fuel heater to preheat the fuel.

13. The microturbine of claim 9 wherein the prevaporizing zone further includes a tangential-entry swirler including a plurality of air inlet jets.

14. The microturbine of claim 9 further comprising:
   a. a housing;
   b. a first rotatable shaft mounted through the housing, the first rotatable shaft having a first end and a second hot exhaust end, wherein the compressor is mounted to the first end of the rotatable shaft and wherein the radial inflow compressor turbine is mounted to the second end of the rotatable shaft, and wherein the radial inflow compressor turbine receives the high-pressure hot gas produced from the prevaporizing combustor thereby causing the microturbine rotatable shaft to rotate;
   c. a second rotatable power output shaft having a first end and a second end, wherein the axial free power turbine is mounted to the first end of the second power output shaft to extract power from the high-pressure hot gas; and
   d. a plurality of bearings for supporting the first rotatable shaft and second rotatable power output shaft.

15. A microturbine for powering a generator comprising:
   a. a housing;
   b. a first rotatable shaft mounted through the housing, the rotatable shaft having a first end and a second hot exhaust end;
   c. a second power output shaft;
   d. a centrifugal compressor comprising a compressor rotor, a diffuser and a volute to provide a continuous flow of compressed air;
   e. a prevaporizing combustor for mixing the compressed air with fuel, wherein the compressed air is mixed with fuel in small, measured amounts to produce a high-pressure hot gas, wherein the compressor is mounted to the first end of the rotatable shaft and wherein the radial inflow compressor turbine is mounted to the second end of the rotatable shaft and receives the high-pressure hot gas produced from the prevaporizing combustor thereby causing the microturbine rotatable shaft to rotate, and wherein the prevaporizing combustor comprises:
      i. a prevaporizing zone for mixing compressed air and fuel to an air/fuel mixture, wherein the prevaporizing zone includes a first compressed air channel and a second fuel channel, and
      ii. a combustion zone wherein the combustion zone includes a compressed air channel for receiving compressed air, the combustion zone comprising:
         1. a primary zone for mixing the air/fuel mixture from the prevaporizing zone with compressed air in the combustion zone to produce a combustion product, wherein the primary zone comprises:
            a. a liner wall containing openings for air flow,
            b. a splash ring and effusion cooling holes to produce an insulating film of air to flow along the liner wall, and
            c. an igniter to initiate a reaction of combustion gases, and
         2. a dilution zone for receiving the combustion product of the primary zone, wherein the dilution zone comprises a liner wall containing openings for air flow to reduce the temperature of combustion gases;
   f. a combustor air bypass to control the compressed air from the centrifugal compressor, the combustor air bypass comprising a duct connecting the centrifugal compressor with the prevaporizing combustor;
   g. a radial inflow compressor turbine to extract power from the high-pressure hot gas;
   h. an axial free power turbine to extract power from the high-pressure hot gas;
   i. a generator having a stator installed in the housing and a rotor fixed to the second power output shaft so as to be rotated together; and
   j. a generator cooling system to provide cooling air to the generator, the system comprising:
      i. a passage surrounding the generator, the passage having a first end and a second end, wherein the first end is open to the atmosphere and the second end is open to the discharge area of the axial free power turbine to create a cool air draw from the first end of the passage to the second end of the passage, and
      ii. an exhaust diffuser for expelling air along with microturbine discharge gas.

16. The microturbine of claim 15, further comprising an exhaust heat exchanger to preheat the fuel.

17. The microturbine of claim 15, further comprising a supplemental electric fuel heater to preheat the fuel.

18. The microturbine of claim 15 wherein the prevaporizing zone further a tangential-entry swirler including a plurality of air inlet jets.

19. The microturbine of claim 15 further comprising:
   a. a housing;
   b. a first rotatable shaft mounted through the housing, the first rotatable shaft having a first end and a second hot exhaust end, wherein the compressor is mounted to the first end of the rotatable shaft and wherein the radial inflow compressor turbine is mounted to the second end of the rotatable shaft, and wherein the radial inflow compressor turbine receives the high-pressure hot gas produced from the prevaporizing combustor thereby causing the microturbine rotatable shaft to rotate;
   c. a second rotatable power output shaft having a first end and a second end, wherein the axial free power turbine is mounted to the first end of the second power output shaft to extract power from the high-pressure hot gas; and
   d. a plurality of bearings for supporting the first rotatable shaft and second rotatable power output shaft.

\* \* \* \* \*